(12) United States Patent
Ekeroth

(10) Patent No.: US 6,783,571 B2
(45) Date of Patent: Aug. 31, 2004

(54) METHOD AND A DEVICE FOR CLEANING OF CRANKCASE GAS

(75) Inventor: Mats Ekeroth, Landskrona (SE)

(73) Assignee: Alfa Laval Corporate AB, Lund (SE)

( * ) Notice: Subject to any disclaimer, the term of this patent is extended or adjusted under 35 U.S.C. 154(b) by 0 days.

(21) Appl. No.: 10/283,783

(22) Filed: Oct. 30, 2002

(65) Prior Publication Data

US 2003/0233932 A1 Dec. 25, 2003

(30) Foreign Application Priority Data

Jun. 20, 2002 (SE) ................................. 0201933

(51) Int. Cl.$^7$ ............................................. B01D 45/14
(52) U.S. Cl. ..................... 95/8; 55/385.3; 55/400; 55/406; 55/DIG. 19; 95/12; 95/19; 95/22; 95/23; 95/270; 96/397; 123/573
(58) Field of Search ........................... 95/8, 12, 19–23, 95/270, 269; 55/385.3, 400, 403–407, 467, DIG. 19; 96/397; 123/573

(56) References Cited

U.S. PATENT DOCUMENTS

| | | | |
|---|---|---|---|
| 3,234,716 A | * | 2/1966 | Sevin et al. .............. 210/360.1 |
| 5,229,014 A | * | 7/1993 | Collins ......................... 210/787 |
| 5,462,585 A | * | 10/1995 | Niskanen et al. .............. 95/261 |
| 5,922,092 A | * | 7/1999 | Taylor .......................... 55/295 |
| 5,954,035 A | | 9/1999 | Höfer et al. ................. 123/573 |
| 5,976,224 A | * | 11/1999 | Durant et al. .................. 95/268 |
| 6,004,382 A | * | 12/1999 | Pikesh et al. .................. 95/270 |
| 6,030,437 A | * | 2/2000 | Gourrier et al. .............. 96/399 |

FOREIGN PATENT DOCUMENTS

| | | |
|---|---|---|
| WO | WO 99/56883 | 11/1999 |
| WO | WO 01/36103 A1 | 5/2001 |

* cited by examiner

Primary Examiner—Richard L. Chieba
(74) Attorney, Agent, or Firm—McCormick, Paulding & Huber LLP

(57) ABSTRACT

For cleaning of crankcase gas produced by an internal combustion engine, that is arranged for propelling a vehicle, use is made of a centrifugal separator having a centrifugal rotor that is mounted on the vehicle. The cleaning efficiency of the centrifugal separator is changed by changing the rotational speed of an electrical motor, that is connected to a source of current on the vehicle and arranged for driving said centrifugal rotor.

21 Claims, 2 Drawing Sheets

METHOD AND A DEVICE FOR CLEANING OF CRANKCASE GAS

CROSS REFERENCE TO RELATED APPLICATIONS

Figure 1:
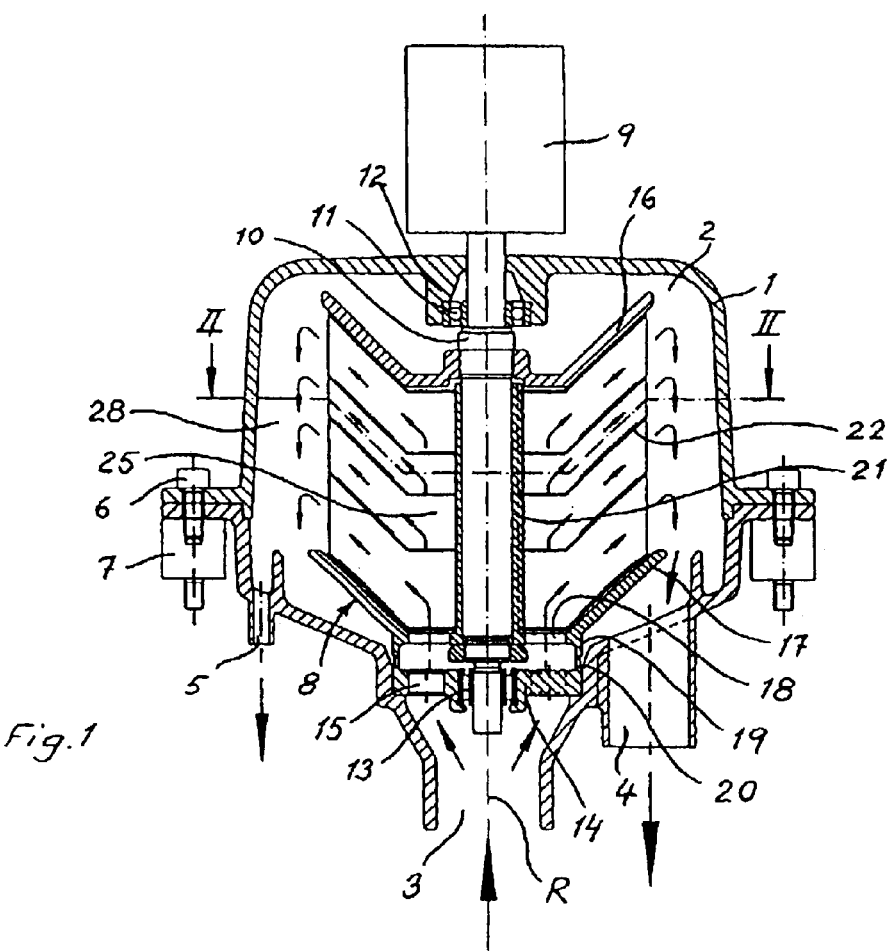

This application is entitled to the benefit of, and incorporates by reference, essential subject matter disclosed in Swedish Patent Application No. 0201933-9 filed on Jun. 20, 2002.

The present invention relates to a method and a device for cleaning of crankcase gas that is produced during operation of an internal combustion engine used for propelling a vehicle.

Cleaning of crankcase gas requires a cleaning device that can remove effectively the utmost small particles, solid and/or liquid, present in suspended form in the crankcase gas. In recent years centrifugal separators of different kinds have been suggested for such cleaning, and different methods have been suggested for driving of a centrifugal separator used for this purpose. Thus, it has been suggested that a centrifugal separator would be driven mechanically by means of one of the ordinary shafts of the combustion engine, e.g. the crank shaft or the cam shaft (see for instance U.S. Pat. No. 5,954,035). Another suggestion has been that a centrifugal separator would be driven by means of an electrical motor (see for instance WO 01/36103). Even another suggestion has been that a fluid, gas or liquid, would be pressurised by means of the combustion engine and be used for driving a turbine of one kind or another, coupled to a centrifugal rotor for cleaning of crankcase gas (see for instance WO 99/56883).

One starting point in connection with use of a centrifugal separator for cleaning of crankcase gas, that has been produced by an internal combustion engine carried by a vehicle, is that the energy for driving the centrifugal separator should be derived from the combustion engine, either directly or indirectly through a source of energy of some kind, e.g. a generator or an accumulator for electric current or a compressor or a pressure vessel containing compressed air.

This is not completely without problems, however, as a combustion engine is being loaded to different degrees during its operation not only for propelling of the vehicle but also for energizing of various auxiliary equipment on board the vehicle. The supply of energy from a source of energy of the said kind is limited and, above all, the source of energy may be so heavily loaded in certain situations for the vehicle that further withdrawal of power is not possible or acceptable, e.g. for safety reasons.

A main object of the present invention is to provide a method and a device for cleaning of crankcase gas from an internal combustion engine that is arranged for propelling a vehicle, enabling minimization and /or optimization of the effect and energy requirement for the cleaning.

This object can be achieved according to the invention by means of a device including
  a centrifugal separator having a centrifugal rotor that is arranged for mounting on the vehicle and for cleaning of said crankcase gas,
  an electrical motor, that for its operation is connectable to a source of current available on the vehicle and that is arranged for rotation of the centrifugal rotor, and
  equipment for changing the cleaning efficiency of the centrifugal separator, including a control equipment arranged for changing the rotational speed of the electrical motor and, thereby, of the centrifugal rotor during maintained operation of the combustion engine.

By means of a device of this kind the crankcase gas cleaning may be performed in an optimum way, as need comes up for such cleaning, by use of a smallest possible amount of energy. Hereby, also unnecessary wear of different parts of the device, such as bearings and the like, may be avoided. The crankcase gas cleaning may also, periodically, be interrupted completely, although the combustion engine is maintained in operation. The invention is based on an understanding that the crankcase gas cleaning need not have the same efficiency all the time the combustion engine is used and also that the cleaning efficiency of a centrifugal separator can be controlled by changing of the rotational speed of the centrifugal rotor.

The controlling of the rotational speed of the electrical driving motor and, thereby, of the centrifugal rotor may be performed in many different ways, among other things depending upon the type of electrical motor that is used. For instance, already previously known technology, involving frequency conversion, may be used for controlling of the rotational speed of the electrical motor. In a most simple case the controlling may be performed, however, by means of one or more relays of a conventional kind. In a relay of this kind an input circuit may be arranged to be influenced by data intended for changing of the cleaning efficiency of the centrifugal separator, and an output circuit may be arranged to change the rotational speed of the electrical motor in dependence of such data.

As to the required input data for the controlling here in question, the device according to the invention is preferably connectable to a source of information that is available on the vehicle and arranged for delivery of data relevant to an existing or upcoming need for cleaning of crankcase gas produced by the combustion engine. Thus, the control equipment preferably is adapted to be influenced by data from said source of information in a way such that the rotational speed of the centrifugal rotor is adapted, continuously or stepwise, to said need of crankcase gas cleaning. However, sometimes an extremely large need of energy may come up for some other operation on the vehicle, which has a higher priority than the crankcase gas cleaning, and during a certain period of time an accurate control of the kind just mentioned may therefore have to be interrupted. During a period time of this kind it may be necessary to interrupt the crankcase gas cleaning completely or, alternatively, to reduce it to an extent that can be predetermined and pre-programmed for various operational situations for the vehicle. Said control equipment of the device according to the invention, thus, sometimes may have to be influenced in a way different than that happening when the control equipment is to accurately adapt the cleaning efficiency of the centrifugal separator to an actually prevailing cleaning need.

On a modern vehicle of the category large lorries and working machines there is normally a computer network installed. One previously known computer network of this kind is called CAN-bus (CAN=Controller Area Network). In this computer network, which preferably includes a vehicle computer and is coupled to many different sensors placed in different parts of the vehicle and in the combustion engine, there are a lot of data available concerning various functions and conditions prevailing on the vehicle. Examples of data which may be available are:
  the present engine speed
  the present load on the engine
  the load on the engine as desired by the driver of the vehicle (present pressure on the accelerator pedal of the vehicle)

the engine temperature the ambient air temperature the speed of the vehicle the total operational time of the engine since the engine was new the driving distance of the vehicle since the engine was new operational time since the engine was last started Of course, many other data are available in a network of this kind depending upon which components are present on the vehicle. By means of a vehicle computer connected with the network various data may be combined and converted into control signals of various kinds for controlling of various functions on board the vehicle, e.g. signals for controlling of the cleaning of crankcase gas according to the invention.

In a preferred embodiment of the device according to the invention its equipment for changing the cleaning efficiency of the centrifugal separator may comprise a decoding- or selection device, that is adapted to receive or choose only certain ones of several data available in a source of information of this kind, said control equipment being adapted to be actuated by such received or chosen data and, in turn, to change the rotational speed of the electrical motor in dependence thereof.

Irrespective of whether a computer network of the aforementioned kind is available or not the cleaning device in an advantageous embodiment of the invention is preferably connectable to a sensor that is arranged to sense an actual change of the amount of crankcase gas being produced by the combustion engine. Alternatively or in addition thereto, the cleaning device may be connectable to a sensor, that is arranged to sense a change of the amount of particles, solid or liquid, present in the crankcase gas to be cleaned, e.g. crankcase gas being on its way between the crankcase of the combustion engine and the centrifugal separator. In an arrangement of this kind the cleaning efficiency of the centrifugal separator may be adapted to a cleaning need that can be expressed by a formula including values for both the amount of particles present in the crankcase gas on its way to be cleaned and the actual flow of such crankcase gas.

In addition to a device of the kind described above the invention includes a method of cleaning crankcase gas according to the subsequent claims.

Figure 2:
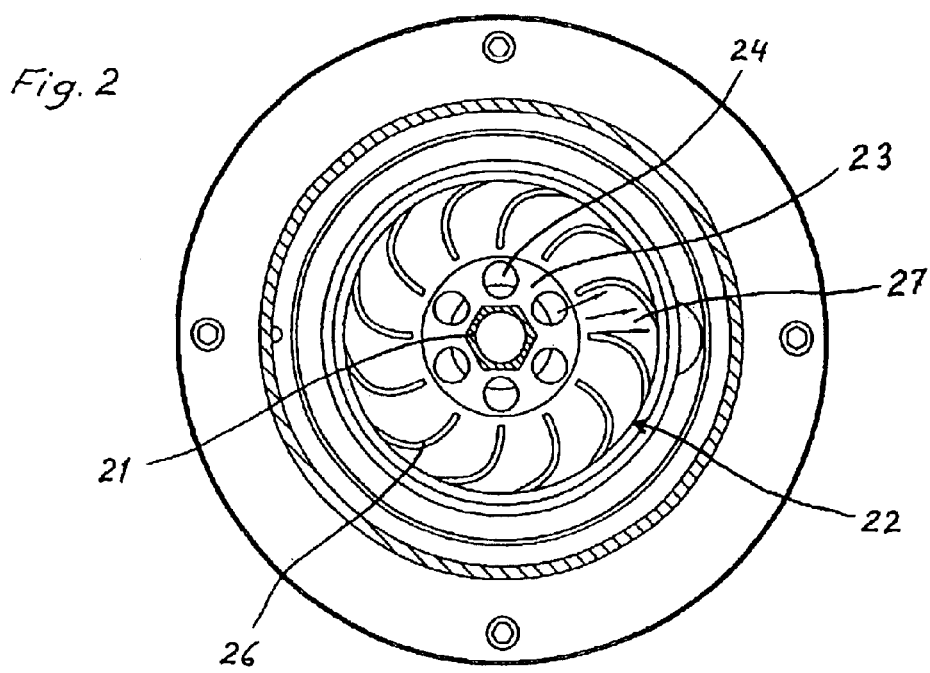
Figure 3:
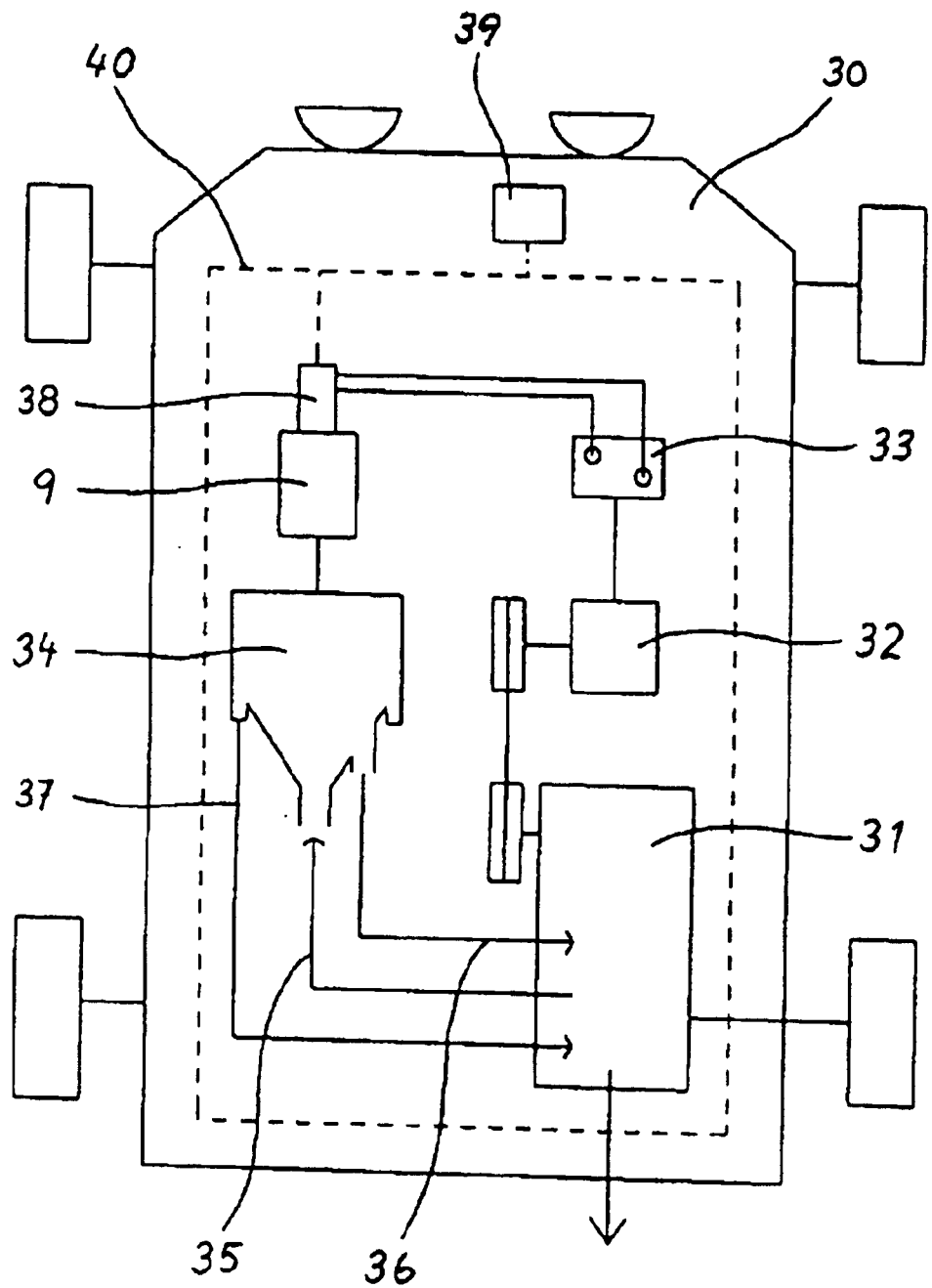

The invention is described more closely in the following with reference to the accompanying drawing, in which FIG. 1 shows an example of an electrical motor driven centrifugal separator of the kind that can be included in a device according to the invention, FIG. 2 is a sectional view taken along the line II—II in FIG. 1 and FIG. 3 illustrates schematically a vehicle equipped with a device according to the invention.

In the drawing FIG. 1 shows a sectional view of a centrifugal separator that may be mounted on a vehicle and is intended for cleaning of crankcase gas from particles suspended therein, which have a larger density than the gas. The centrifugal separator includes a housing 1 delimiting a chamber 2. The housing forms a gas inlet 3 to the chamber 2 for gas to be cleaned and a gas outlet 4 from the chamber 2 for clean gas. The housing further forms a particle outlet 5 from the chamber 2 for particles having been separated from the gas.

The housing 1 includes two parts which are kept together by means of a number of screws 6. These screws 6 are also adapted to fix the housing to suspension members 7 of some elastic material, through which the housing may be supported on said vehicle (not shown). Within the chamber 2 a rotor 8 is arranged rotatable around a vertical rotational axis R. An electrical motor 9 is arranged for rotation of the rotor 8. The rotor 8 includes a vertically extending central spindle 10 which at its upper end is journalled in the housing 1 through a bearing 11 and a bearing carrier 12 and at its lower end is journalled in the housing 1 through a bearing 13 and a bearing carrier 14. The bearing carrier 14 is situated in the gas inlet 3 of the housing and is therefore provided with through holes 15 for incoming gas to be cleaned in the chamber 2.

The rotor 8 further includes an upper end wall 16 and a lower end wall 17, said two end walls being connected with the central spindle 10. The lower end wall 17 in a central portion is provided with through holes 18, so that the interior of the rotor may communicate with the gas inlet 3. Furthermore, the lower end wall 17 is provided with an annular flange 19 that is arranged to cooperate with a similar annular flange 20 of the bearing carrier 14, so that gas entering through the gas inlet 3 is conducted into the interior of the rotor 8 through the just mentioned holes 18. The flanges 19 and 20 may be arranged to seal completely against each other, but a complete sealing between them is not necessary.

The lower end wall 17 is shaped in one piece with a hollow column 21, which extends axially upwardly from the end wall 17 and closely surrounds the central spindle 10. The column extends all the way up to the upper end wall 16. In the area of the column 21 the central spindle 10 is cylindrical, preferably for cost reason circular cylindrical, and the inside of the column 21 is formed in the same way as the outside of the spindle. The outside of the column 21 has a non-circular cross sectional shape, as can be seen from FIG. 2.

Between the end walls 16 and 17 there is arranged a stack of conical separation discs 22. Each one of these has one portion formed as a frustum of a cone and one plain portion 23 formed integrally therewith, closest to the column 21. As shown in FIG. 2, the plain portion is formed so that it may engage with the non-circular column 21 in a way such that the separation disc shall not be able to rotate relative to the column 21. Furthermore, the plain portion 23 is provided with several through holes 24. Independent of whether the holes 24 in the various separation discs 22 are axially aligned or not they form together with the interspaces between the central portions of the separation discs 22 a central inlet space 25 within the rotor (see FIG. 1), which communicates with the gas inlet 3.

For the sake of clarity the drawing shows only a few separations discs 22 having large axial interspaces. In practice, many more separation discs are to be arranged between the end walls 16 and 17, so that relatively thin interspaces are formed there between.

FIG. 2 shows the side of a separation disc 22, that is facing upwardly in FIG. 1. This side is called the inside of the separation disc in the following, since it is facing in a direction inwardly towards the rotational axis of the rotor. As can be seen, the separation disc on its inside is provided with several elongated ribs 26 forming spacing members between this separation disc and the separation disc situated closest above in the disc stank. Between adjacent ribs 26 in an interspace between two separation discs there are formed flow passages 27 for gas to be cleaned. The ribs 26 extend, as shown in FIG. 2, along curved paths and form at least at the radially outer circumferencial portions of the discs an angle with the generatrices of the separation discs. As a consequence of the curved form of the ribs 26 also the flow passages 27 for the gas to be cleaned extend along paths which are curved in a corresponding way. The ribs 26 preferably extend across substantially the whole conical portion of each separation disc and end up in the vicinity of the radially outer surrounding edge of the separation disc.

An annular space 28 surrounds the rotor 8 in the housing 1 and constitutes part of the chamber 2.

The centrifugal separator described above is previously known and its function is extensively described in WO 01/36103. This function can be described briefly, as follows.

By means of the electrical motor 9 the rotor 8 is brought into rotation around the vertical axis R. Crankcase gas that has been produced by a combustion engine (not shown) and that is to be freed from oil particles and possibly also solid particles suspended therein, enters through the gas inlet 3 and is conducted upwardly in the central space 25 in the rotor 8. From there the crankcase gas is conducted into the interspaces between the conical portions of the separation discs 22, where it is entrained in the rotor rotation. As a consequence of the rotation the particles suspended in the gas are separated by being thrown by the centrifugal force against the insides of the separation discs, on which they then slide, or run in the form of a liquid, radially outwardly towards the surrounding edges of the separation discs. From these surrounding edges the particles in an agglomerated or coalesced form are thrown outwardly towards the surrounding wall of the stationary housing 1, along which they move downwardly and further out through the particle outlet 5.

The crankcase gas having been freed from particles flows out from the interspaces between the separation discs 22 to the annular space 28, which its leaves through the gas outlet 4.

The separation or cleaning efficiency of the centrifugal separator to a large extent depends on the rotational speed of the centrifugal rotor 8. The larger this speed is, the larger becomes the separation efficiency. By controlling of the rotational speed of the electrical motor 9 the cleaning efficiency of the centrifugal separator may be changed. Even in a non-rotating state the centrifugal rotor has a certain, although small, cleaning effect as a consequence of the crankcase gas being forced to change its direction of flow several times and to flow through narrow channels upon its passage through the centrifugal rotor.

FIG. 3 illustrates a vehicle 30 and an internal combustion engine 31 supported thereby and arranged for the propelling of the vehicle. The combustion engine 31 is arranged also for operation of a current generator 32 that is connected with a current accumulator 33. The vehicle 30 is also equipped with a centrifugal separator 34 of the kind shown in FIG. 1 and 2. A conduit 35 is arranged for conducting contaminated crankcase gas from the crankcase of the engine 31 to the gas inlet of the centrifugal separator, and conduits 36 and 37 are arranged for conducting cleaned crankcase gas and particles and oil separated from the crankcase gas, respectively, back to the combustion engine. The cleaned gas is conducted to the air intake of the combustion engine, and the separated particles are conducted together with the separated oil back to the so-called oil tray of the combustion engine. Alternatively, the cleaned gas could have been released to the surrounding atmosphere, while the separated particles and oil could have been collected in a separate vessel.

FIG. 3 also shows the electrical motor 9, which can be seen from FIG. 1 and which is arranged for driving the rotor 8 of the centrifugal separator. In connection to the electrical motor 9 there is arranged a control equipment 38 that is adapted to drive the electrical motor 9 at varying speeds. The control equipment 38 for current supply to itself and to the electrical motor is connected to the current generator 32 and to the current accumulator 33.

Further installed on the vehicle 30 is a computer network including a vehicle computer 39 and a so-called data-bus 40. A large number of sensors of various kinds are connected to the computer network for collection of data concerning different functions on the vehicle. Also said control equipment 38 is connected to this computer network, from which information can be collected for connection and disconnection of the electrical motor 9 or for change of the rotational speed of the electrical motor by means of the control equipment. Through the connection to the computer network information can also be given thereto of, for instance, the condition and operational status of the electrical motor and the centrifugal separator and the degree of contaminants in contaminated and cleaned crankcase gas.

The aforementioned motor 9 may be a direct-current motor or an alternating-current motor; either a synchronous motor or an asynchronous motor. Depending upon the type of the electrical motor the control equipment 38 may be designed in many different ways self-evident for a person skilled in the art of electrical motors.

If the control equipment 38 is connected to a computer network of the above mentioned kind, it does not have to be particularly complicated with a regard to its ability to treat signals coming from different sensors on the vehicle. In a case like that, namely, the aforementioned vehicle computer is equipped for a required such signal treatment and for production of a control signal for the driving of the electrical motor. The control equipment 38 in this case has to include a decoding means (interface), by means of which it can choose a correct signal from the computer network, after which the signal can be used for the controlling of the rotational speed of the electrical motor.

In the simplest case the control equipment may include an electrical relay, that is arranged for starting or stopping the operation of the electrical motor by means of a received control signal. A relay of this kind may have an input circuit influenceable by data intended for controlling of the separation efficiency of the centrifugal separator 34, and an output circuit arranged for changing of the rotational speed of the electrical motor 9 depending upon these data.

However, the control equipment preferably includes a device for driving the electrical motor 9 at different speeds; either so that a limited number of speeds can be obtained or so that a continuous change of the motor speed can be performed. Different kinds of devices for speed regulation of motors (both direct-current and alternate-current motors) are well known and need no closer description here. For a direct-current motor a simple device for voltage control may be used. For an alternate-current motor various kinds of frequency control equipment may be used. Equipment of this kind is available for production of alternate current of variable frequency either by means of direct current or by means of alternate current.

Irrespective of whether the control equipment is of a sophisticated kind or not, it should be of a kind such that the operation of the electrical motor can be interrupted while the combustion engine is still in operation, e.g. at idle driving or upon operation of the combustion engine at a speed lower than a certain value. If desired, the operation of the electrical motor may be manually disconnectable and/or automatically connectable a certain period of time after the combustion engine has been started or after a certain rotational speed of the combustion engine has been reached. The electrical motor should be adapted for operation at a voltage of 48 volts or lower, e.g. 14, 28 or 42 volts.

As to the signal, by means of which the speed of the electrical motor should be controlled or adjusted, it may be a function of many different variable factors. Thus, one or more of the following factors may be included, for instance:

the gas pressure in the crankcase of the combustion engine the gas pressure in the air intake of the combustion engine the rotational speed of the combustion engine the load on the combustion engine the ambient air temperature the lubricating oil temperature of the combustion engine the total operational time of the combustion engine If there is no computer network of the kind described above, the rotational speed of the electrical motor may be adjusted or controlled by means of data transferred to the control equipment 38 directly from a sensor of some suitable kind. For instance, a sensor may be arranged in one way or another to sense the amount of crankcase gas being produced each moment by the combustion engine. A measurement of the amount of crankcase gas produced may be constituted by the pressure prevailing in the crankcase of the combustion engine or in a passage for crankcase gas between the crankcase and said centrifugal separator. Another measurement of the production of crankcase gas may be constituted by a value of the prevailing gas flow in said passage.

Another measurement of the need for cleaning of the produced crankcase gas may be constituted by a sensed value of the content of oil mist in the crankcase gas. A measured value of this kind may, in combination with a value showing the amount (i.e. the volume) of produced crankcase gas, be composed to a signal for controlling of the rotational speed of the electrical motor.

It has been presumed above that a required cleaning of the crankcase gas is actually achieved by the described control of the rotational speed of the electrical motor by means of a signal having been generated on the basis of an assumed or sensed need of crankcase gas cleaning. Of course, it is alternatively possible, if desired, to control the rotational speed of the electrical motor by means of a sensed parameter indicating the degree of actual cleanliness of the crankcase gas leaving the centrifugal separator. Thus, a sensor may be arranged to sense the amount of particles still remaining in a suspended form in crankcase gas, that leaves the centrifugal separator, and to actuate the control device so that it either increases or decreases the rotational speed of the electrical motor. Even a combination of different control methods is possible. Thus, for instance, a certain rotational speed (e.g. a stepwise chosen rotational speed) of the electrical motor may be set depending upon one or several factors, as described before, after which an accurate control of the rotational speed can be performed by means of a sensed parameter, as just described, indicating the actual result of the crankcase gas cleaning by means of the centrifugal separator.

An accurate control in the last described manner may be suitable if the cleaned crankcase gas (in stead of being conducted to the air intake of the combustion engine) is to be released to the ambient atmosphere.

Possible insufficiently cleaned crankcase gas can, in this case, still be conducted back to the combustion engine through its air intake.

What is claimed is:

1. A device for cleaning of crankcase gas being produced during operation of an internal combustion engine that is arranged for propelling a vehicle, said device comprising:

a centrifugal separator having a centrifugal rotor that is arranged for mounting on the vehicle and for cleaning of said crankcase gas;

an electrical motor, which for its operation is connectable to a current source available on the vehicle and which is arranged for rotation of the centrifugal rotor; and equipment for changing the cleaning efficiency of the centrifugal separator, including control equipment arranged for changing the rotational speed of the electrical motor and, thereby, of the centrifugal rotor during maintained operation of the combustion engine, said equipment being connectable to a source of information available on board the vehicle.

2. A device according to claim 1, in which the control equipment is arranged for changing the rotational speed of the electrical motor from a first value to a second value, both values being larger than nil.

3. A device according to claim 1, in which the source of information is adapted to supply data relevant for an existent or coming need of cleaning of crankcase gas being produced by the combustion engine, the control equipment being arranged to be actuated by data from the source of information and to change the rotational speed of the electrical motor in dependency of these data.

4. A device according to claim 1, in which said equipment for changing of the cleaning efficiency of the centrifugal separator includes a decoding or selection means that is arranged to receive or choose only certain ones of several data available in said source of information, said control equipment being arranged to be actuated by received or chosen such data and to change the rotational speed of the electrical motor in dependence thereof.

5. A device according to claim 1, in which said source of information includes a sensor arranged to sense the cleanliness of crankcase gas having left the centrifugal separator.

6. A device according to claim 1, which is connectable to a sensor arranged to sense and supply data representative for an actual change of the amount of crankcase gas being produced by the combustion engine, the control equipment being arranged to be actuated by data supplied by the sensor.

7. A device according to claim 6, in which said sensor is arranged to sense a change of a flow that is generated as consequence of the production of crankcase gas of the combustion engine.

8. A device according to claim 6, in which said sensor is arranged to sense a change of an over pressure being generated as a consequence of the production of crankcase gas of the combustion engine.

9. A device according to claim 1, in which said control equipment includes a relay having an input circuit that is actuatable by data intended for control of the separation efficiency of the centrifugal separator, and an output circuit arranged for changing the rotational speed of the electrical motor in dependence of these data.

10. A device according to claim 1, in which said control equipment is arranged to change the rotational speed of the electrical motor substantially continuously.

11. A device according to claim 1, in which said control equipment is adapted to change the rotational speed of the electrical motor stepwise between at least two values larger than nil.

12. A method of cleaning crankcase gas produced during operation of an internal combustion engine, that is arranged for propelling a vehicle, comprising:

using a centrifugal separator which has a centrifugal rotor, mounted on the vehicle, for cleaning of the crankcase gas;

using an electrical motor, which for its operation is connectable to a source of current available on the vehicle, for rotation of the centrifugal rotor; and changing the separation efficiency of the centrifugal separator by changing the rotational speed of the electrical motor and thereby of the centrifugal rotor, while maintaining the combustion engine in operation, the rotational speed of the electrical motor being changed by guidance of data collected from an information source available on board the vehicle.

13. A method according to claim 12, including changing the rotational speed of the electrical motor from a first value to second value, both larger than nil.

14. A method according to claim 12, including collecting said data from a source of information of a kind including more data than those needed for changing the cleaning efficiency of the centrifugal separator.

15. A method according to claim 14, including collecting said data from a computer network.

16. A method according to claim 12, including changing the rotational speed of the electrical motor by means of data being representative for an actual change of the amount of crankcase gas produced by the combustion engine.

17. A method according to claim 16, including changing the rotational speed of the electrical motor by means of a sensed change of a crankcase gas flow generated as a consequence of the production of crankcase gas of the combustion engine.

18. A method according to claim 16, including changing the rotational speed of the electrical motor by means of a sensed change of a crankcase gas over pressure generated as a consequence of the production of crankcase gas of the combustion engine.

19. A method according to claim 12, including using an electrical relay, that includes an input circuit and an output circuit, for changing the rotational speed of the electrical motor, data in the form an electrical signal being caused to influence said input circuit, and the output circuit of the relay being caused to actuate the electrical motor to change its rotational speed.

20. A method according to claim 12, including performing a substantially continuous change of the rotational speed of the electrical motor by means of data collected from said source of information.

21. A method according to claim 12, including stepwise changing the rotational speed of the electrical motor by means of data collected from said source of information.

* * * * *